Aug. 18, 1964  C. E. KEPLER  3,144,752
INJECTION THRUST VECTORING
Filed Oct. 2, 1961  2 Sheets-Sheet 1
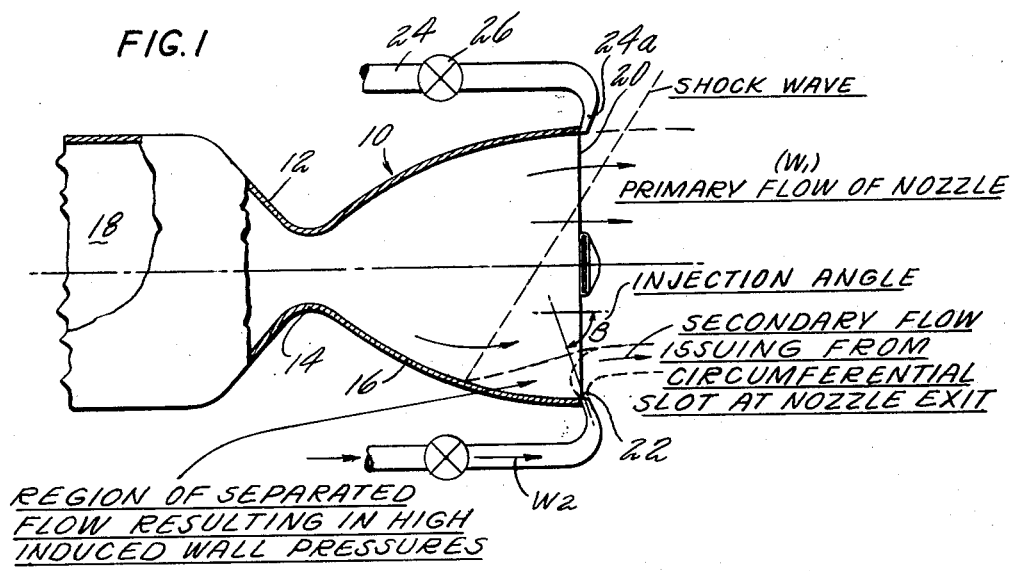
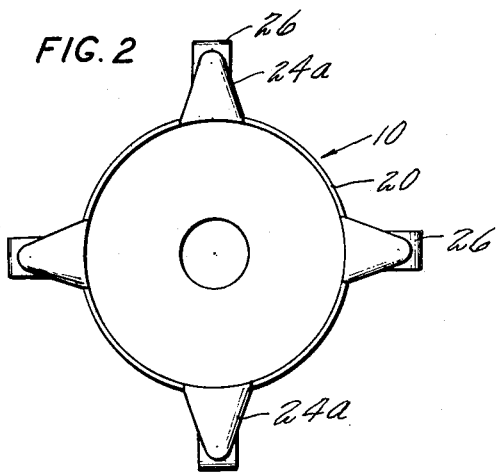
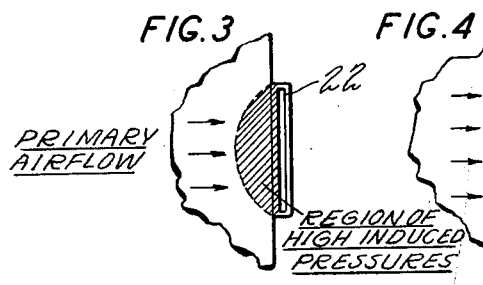
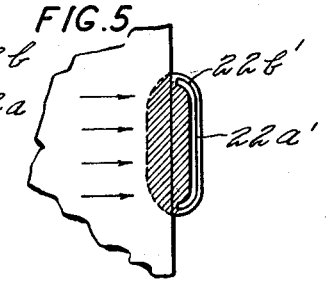
INVENTOR
CHARLES EDWARD KEPLER
BY *David S. Fishman*
ATTORNEY Aug. 18, 1964

C. E. KEPLER 3,144,752

INJECTION THRUST VECTORING

Filed Oct. 2, 1961

INVENTOR
CHARLES EDWARD KEPLER
BY *David S. Fishman*
ATTORNEY 3,144,752
INJECTION THRUST VECTORING
Charles Edward Kepler, East Hartford, Conn., assignor to United Aircraft Corporation, East Hartford, Conn., a corporation of Delaware
Filed Oct. 2, 1961, Ser. No. 142,146
2 Claims. (Cl. 60—35.54)

This invention relates to directional control for propulsion vehicles. More particularly, it relates to a new and improved system for producing lateral forces on a propulsion vehicle by injecting a fluid into a supersonic exhaust stream.

The basis concept of achieving direction control by secondary fluid injection is disclosed in the U.S. patent to O. E. Wetherbee, Jr., No. 2,943,821. However, there are several shortcomings in both the system disclosed in the Wetherbee patent and other systems known in the art; and the present invention constitutes a significant improvement in the art of injection thrust vectoring by eliminating these shortcomings.

In prior systems the secondary fluid for thrust vectoring has been introduced into the primary stream in the nozzle through injection ports located in the nozzle wall upstream of the discharge end of the nozzle. This means that injection ports have had to be cut in the wall of the nozzle. This impairs the structural integrity of the nozzle and creates areas of stress concentration. These problems are particularly acute in view of the relatively thin walls found in present day rocket technology. Furthermore, in systems where the nozzle is cooled by means of a cooling jacket surrounding the nozzle, the use of injection ports passing through the nozzle wall disrupts coolant flow and creates a serious problem of localized hot spots.

In the prior systems, the ports have been normal to the nozzle wall, and hence, in the ordinary convergent-divergent nozzle the secondary fluid has a flow component in the downstream direction of the primary stream. In tests conducted using round injection ports located in the wall of a nozzle upstream of the discharge end and normal to the nozzle wall, it has been found that the total lateral force generated is linear with secondary or injection weight flow and is independent of injection port location. The total lateral force is composed of the component of the injection nozzle reaction force perpendicular to the main longitudinal axis of the nozzle $F_2$ and the component of the induced force perpendicular to the main longitudinal axis of the nozzle $F_2'$. In these tests it was determined that the ratio of total lateral force $(F_2+F_2')$, generated by secondary injection at any secondary weight flow $W_2$, to the nonvectored primary stream thrust $F_1$ is 1.15 times the force which could be generated by discharging the same weight flow $W_2$ through an auxiliary ideal nozzle disposed 90° to the main longitudinal axis of a primary nozzle having a primary weight flow $W_1$ equal to the primary weight flow of the test nozzle. In other words, these tests determined that for a primary stream weight flow $W_1$ and a secondary stream weight flow $W_2$, the ratio of total lateral force $(F_2+F_2')$ to primary stream thrust $F_1$ ($F_1$ measured at 0 secondary flow) for injection thrust vectoring is 1.15 times the force ratio which would be obtained by discharging a weight flow of fluid $W_2$ through an ideal nozzle disposed at 90° to the main longitudinal axis of a primary nozzle having a primary weight flow $W_1$.

The present invention accomplishes an improved injection thrust vectoring system wherein the above-mentioned structural and cooling problems are eliminated, and wherein a considerable increase in lateral force is obtained over previous systems for a given injection fluid weight flow (or conversely, a desired lateral force can be achieved with a greatly reduced secondary fluid weight flow). These new results are achieved by attaching the secondary injection ports to the discharge end of the primary nozzle and injecting the secondary fluid either upstream into the primary nozzle, or perpendicular to the primary nozzle main longitudinal axis, the secondary injection ports being slots, preferably of high aspect ratio, rather than round ports. It has been found that for a given secondary weight flow the lateral force obtained from the system of this invention is considerably greater than that obtained in systems wherein injection is accomplished through ports in the nozzle wall. More particularly, for a given secondary weight flow the lateral force produced by the present invention is on the order of from 1.5 to 2.0 times greater than that produced by prior injection systems using circular ports in the wall of the primary nozzle. Thus, for producing a given lateral thrust, a considerable reduction in secondary fluid storage requirements is realized when a separate source of fluid is used; or in systems where secondary fluid is obtained by bleeding the primary stream, a considerable reduction in bleed requirements is realized. Hence, the present invention results in a system wherein the lateral force due to secondary injection is affected by injection point location, in contrast to the previous systems. It has also been found that in this configuration the lateral force is a function of the angle of injection between the secondary fluid stream and the main longitudinal axis of the vehicle.

Accordingly, one feature of the present invention is a novel system for secondary injection thrust vectoring for propulsion vehicles in which the secondary injection ports are attached to the discharge end of the nozzle.

Another feature of the present invention is a novel secondary injection thrust vectoring system for propulsion vehicles in which significantly greater lateral force is produced than in previous systems for a given weight flow.

Still another feature of the present invention is a novel secondary injection thrust vectoring system for propulsion vehicles in which provision is made for fluid injection into the primary flow stream of an exhaust nozzle without impairing the structural integrity of the nozzle.

Still another feature of the present invention is a novel secondary injection thrust vectoring system for propulsion vehicles in which fluid is injected upstream into the primary nozzle exhaust stream from ports attached to or located at the discharge end of the primary nozzle.

Still another feature of the present invention is a novel secondary injection thrust vectoring system for propulsion vehicles in which fluid is injected upstream into the primary nozzle exhaust stream from ports in the form of high aspect ratio slots attached to or located at the discharge end of the primary nozzle.

Other features and advanages will be apparent from the specification and claims, and from the accompanying drawings which illustrate an embodiment of the invention.

FIG. 1 is a schematic of a rocket nozzle incorporating the secondary injection system of the present invention.

FIG. 2 is a view looking upstream into the rocket nozzle of FIG. 1.

FIG. 3 is a view of a slotted port used for secondary injection in the present invention.

FIG. 4 is a view of a modified slotted port for secondary injection.

FIG. 5 is a view of still another modified slotted port for secondary injection.

Figure 6:
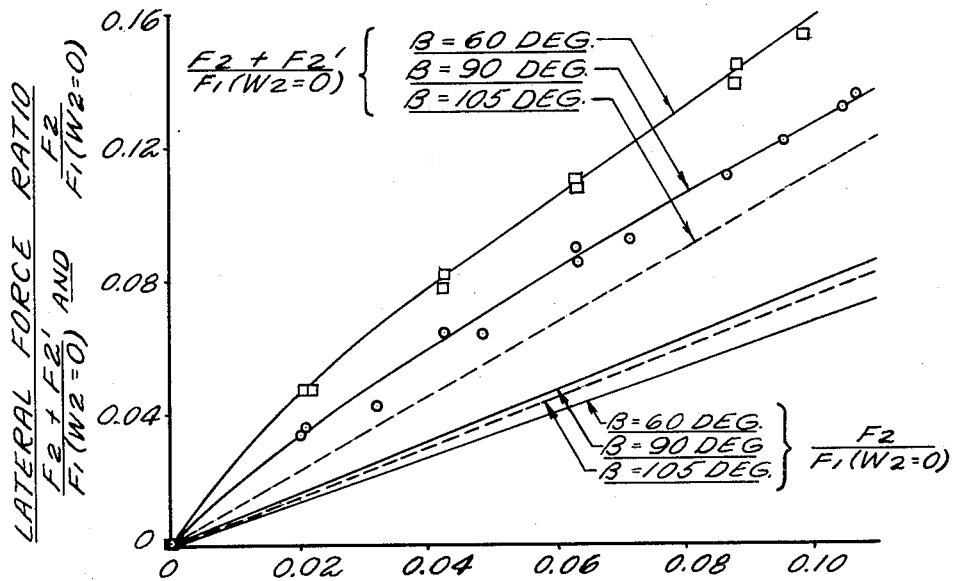
FIG. 6 is a plot of the ratio of lateral force to nonvectored primary stream thrust versus the ratio of secondary weight flow to primary weight flow for propulsion vehicles incorporating the present invention (the lines $\beta=60°$, $\beta=90°$) and for propulsion vehicles using a previously known system (the line $\beta=105°$).

Referring now to FIG. 1, the primary rocket nozzle 10 has a convergent portion 12, a throat portion 14 and a divergent portion 16. Gases generated in combustion chamber 18 constitute the primary weight flow $W_1$ for nozzle 10. These gases are accelerated to a supersonic speed in the well-known fashion by being passed through convergent portion 12, throat 14 and divergent portion 16, and the gases are then discharged past the end 20 of the nozzle to generate a propulsive thrust $F_1$.

A plurality of injection ports 22 are attached to nozzle 10 at the discharge end 20 by any convenient means of attachment such as welding, clamping or bolting. There are at least three injection ports 22 spaced 120° apart, and, as shown in FIG. 2, it is preferred that there be four such injection ports spaced 90° apart. Supply conduits 24, each of which has a flow valve 26 therein, lead from a source of fluid (not shown) to each of the injection ports 22. As shown in FIG. 3, the basic shape of injection port 22 is a high aspect ratio slot extending in a circumferential direction with respect to nozzle 10. As shown in FIGS. 1 and 2, the supply conduits 24 form a flattened and flared portion 24a to meld into ports 22. The high aspect ratio slot configuration has been chosen as the basic form for ports 22 for a number of reasons, one of which is that the length of nozzle 10 is not appreciably increased by attaching the ports 22 to the discharge end thereof.

Directional control, or thrust vectoring, is achieved by selectively operating valves 26 to inject a secondary fluid through one or more ports 22 into the primary flow stream of nozzle 10. This secondary injection creates a shock wave within nozzle 10 and results in a localized increase in force along the wall of nozzle 10 downstream of the shock. The total lateral force generated by this secondary fluid injection, i.e., the force generated perpendicular to the main longitudinal axis of nozzle 10, is made up of two separate forces. One force $F_2$ is the component of the secondary fluid injection reaction perpendicular to the axis of nozzle 10, and the other force $F_2'$ is the component of the increased wall pressure perpendicular to the axis of nozzle 10.

Investigations have determined that the shock wave generated by secondary fluid injection actually emanates from a point upstream of the injection port rather than immediately at the injection port. Hence, the area of increased pressure caused by the shock is located upstream of the point of secondary fluid injection. Investigations have also determined that there is an area of reduced pressure downstream of the point of secondary fluid injection resulting from the second fluid being turned to join the primary stream. This reduced pressure is less than the pressure ordinarily present within the nozzle. Hence, in a system such as is shown in the Wetherbee Patent 2,943,821, the area of reduced pressure is downstream of the injection port location and acts on the nozzle wall. This results in a lateral force which is opposed to the force desired to be generated by secondary injection, thus reducing the effective lateral force produced by secondary injection.

The present invention eliminates the effect of this area of reduced pressure downstream of the injection port by locating the injection ports 22 at the discharge end of the nozzle. In this manner, the full effect of the high pressure behind the shock wave is utilized for induced lateral force, and no adverse influence is experienced from the low pressure area downstream of the secondary injection port, because this low pressure area does not act on the wall of nozzle 10. That is, the low pressure area downstream of injection port 22 does not affect the total induced wall forces within nozzle 10 because this low pressure area has been moved out of the nozzle by locating the injection ports at the discharge end of the nozzle.

It has been found that injecting the secondary fluid in an upstream direction at an angle $\beta$ to the main longitudinal axis of the primary nozzle affects shock wave position, the smaller the angle $\beta$ the more upstream the point on the nozzle wall from which the shock wave emanates. Upstream injection also increases the pressure behind the shock wave. Hence, the secondary injection in an upstream direction increases the $F_2'$ component of lateral force by both increasing the nozzle wall area over which the increased pressure behind the shock wave acts and by increasing the pressure behind the shock. A compromise in the angle of upstream injection must be made to avoid placing the shock in such a position that it will intercept the nozzle wall on the opposite side of the nozzle from which it emanates. Furthermore, since the lateral thrust component $F_2$ decreases as the angle of upstream injection $\beta$ decreases, the angle $\beta$ should be selected to provide the optimum combination between the lateral thrust components $F_2$ and $F_2'$. That is, the angle $\beta$ should not be decreased to the point where the gain in induced lateral force $F_2'$ is less than the corresponding decrease in injection reaction force $F_2$. It is contemplated that for most propulsion nozzles the angle $\beta$ should be between 60° and 45° to optimize the total lateral force generated by secondary fluid injection.

FIG. 6 is a graphic comparison between previous secondary fluid injection systems and a system incorporating the present invention. The lower family of curves is a plot of the injection reaction lateral force ratio, $$\frac{F_2}{F_1(W_2=0)}$$

against secondary weight flow ratios, $W_2/W_1$. The upper family of curves is a plot of the total lateral force ratio generated by secondary injection, $$\frac{F_2+F_2'}{F_1(W_2=0)}$$

against secondary weight flow, the distance between the corresponding curves of the upper and lower families representing the lateral force ratio increase induced by the increased pressure behind the shock wave on secondary injection. In essence, the curves of FIG. 6 show a comparison between lateral force generated by secondary injection and the lateral force which could be obtained by discharging a comparable weight flow ratio, $W_2/W_1$ through an ideal auxiliary nozzle disposed 90° to the primary longitudinal axis of the main propulsion nozzle, the lateral force ratio of such an ideal auxiliary nozzle having a 1:1 relationship with secondary flow ratio.

The lines $\beta=105°$ in both families of curves in FIG. 6 are performance curves for the prior type of secondary injection systems in which injection was accomplished through circular ports in the wall of the nozzle upstream of the discharge end of the nozzle. The lines labeled $\beta=60°$ and $\beta=90°$ in both families of curves are performance lines for a secondary fluid injection system incorporating the principles of the present invention wherein fluid was injected into the primary nozzle stream from ports located at the discharge end of the nozzle.

As can be seen from the upper family of curves of FIG. 6, all of the secondary fluid injection systems show better performance than could be obtained from an ideal auxiliary nozzle. The lower family of curves in FIG. 6 shows that the secondary fluid injection reaction component of lateral force is a direct function of the angle $\beta$. The upper family of curves shows that a significant increase in performance is realized by using the system of the present invention, both the curves $\beta=60°$ and $\beta=90°$ showing significant lateral force ratio increases over the lateral force ratio of the prior system for corresponding weight flow ratios, the present invention producing lateral forces from 1.5 to 2 times the forces generated in the prior system. The upper family of curves also shows the performance increase realized by upstream secondary injection. This is clearly demonstrated by the fact that the best total lateral force ratio was obtained for $\beta=60°$ although the injection reaction component was smallest for that value of $\beta$.

These results show that the present invention accomplishes the new result of increasing secondary injection thrust vectoring performance by locating the secondary injection ports at the discharge end of the primary nozzle; and the present invention also accomplishes the result of increasing secondary injection performance through upstream injection. Thus, it can be seen that a desired lateral force can be produced by the present invention with a smaller secondary injection weight flow than was heretofore necessary, or conversely, a greater lateral force can be produced with the present invention than was produced for a corresponding weight flow in prior systems.

Figure 7:
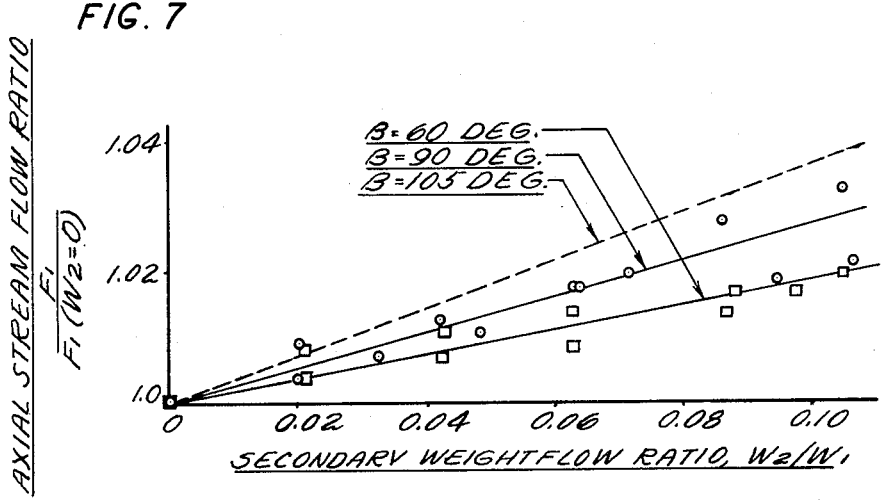
FIG. 7 is a plot of the ratio of total axial thrust to nonvectored axial thrust versus the ratio of secondary weight flow for propulsion vehicles incorporating the present invention (the lines $\beta=60°$, $\beta=90°$) and for propulsion vehicles using a previously known system (the line $\beta=105°$).

FIG. 7, wherein the curves correspond to the similarly labeled curves of FIG. 6, is a plot of axial stream flow ratio, $$\frac{F_1}{F_1(W_2=0)}$$

against secondary weight flow ratio, $W_2/W_1$. FIG. 7 shows that the total axial thrust increases with secondary injection both for the systems incorporating the present invention and the prior secondary injection system. An increase in primary nozzle thrust would be expected in the prior system wherein the secondary fluid is injected with a flow component downstream relative to the primary nozzle flow. Similarly, it would be expected that primary stream thrust would decrease when the present invention is used because the secondary injection stream has a flow component in a direction upstream to the direction of the primary nozzle flow. However, FIG. 7 shows that in the present invention the induced force on the wall of the nozzle caused by the increased pressure behind the shock wave has a sufficiently large thrust component in the direction of the thrust produced by the primary nozzle flow stream to overcome the negative axial thrust component created by upstream secondary fluid injection. Thus, the present invention produces a system wherein primary nozzle thrust is increased notwithstanding the fact that secondary fluid is injected in a direction which produces an axial thrust component opposite to the direction of axial thrust of the primary nozzle.

The use of a high aspect ratio slot as a basic configuration for injection ports 22 further contributes to increasing the total lateral thrust. The use of circular injection ports results in a relatively small area of high induced pressure, because such a nozzle produces an end effect in which the primary air flow can easily slip around the injection port with less pressure increase. A high aspect ratio slot (about 10:1) eliminates this side effect and increases the region of high induced pressures. FIG. 3 shows the basic injection port configuration. A modification is shown in FIG. 4 wherein the basic slot 22a has extending therefrom perpendicular slots 22b pointing upstream. The end slots 22b act to further reduce the undesirable end effects by, in essence, trapping the primary stream end flow. A further modification is shown in FIG. 5 wherein the basic slot 22a' merges into curved end slots 22b' which terminate facing upstream.

It is to be understood that the invention is not limited to the specific embodiment herein illustrated and described, but may be used in other ways without departure from its spirit as defined by the following claims.

I claim:
1. In a propulsion vehicle, an exhaust nozzle having a discharge end, means for generating a supersonic flow through said nozzle, and means for injecting a fluid into said nozzle to create a shock wave, said injection means including a high aspect ratio slot disposed circumferentially with respect to said nozzle, each end of said high aspect ratio slot terminating in an end slot extending upstream of said nozzle from said high aspect ratio slot.

2. A propulsion vehicle as in claim 1 wherein said injection means is attached to the discharge end of said nozzle.

References Cited in the file of this patent
UNITED STATES PATENTS

| | | |
|---|---|---|
| 2,875,578 | Kadosch et al. | Mar. 3, 1959 |
| 2,943,821 | Wetherbee | July 5, 1960 |
| 3,020,714 | Eggers et al. | Feb. 13, 1962 |
| 3,066,485 | Bertin et al. | Dec. 4, 1962 |

FOREIGN PATENTS

| | | |
|---|---|---|
| 64,773 | France | June 29, 1955 |
| | 2nd addition to No. 1,020,287 | |
| 1,197,701 | France | June 8, 1959 |